Oct. 13, 1931.   A. E. KROGH   1,827,528
CONTROL APPARATUS
Filed March 28, 1929   2 Sheets-Sheet 1

INVENTOR.
A. E. KROGH
BY J. E. Hubbell
ATTORNEY

Oct. 13, 1931.  A. E. KROGH  1,827,528
CONTROL APPARATUS
Filed March 28, 1929   2 Sheets-Sheet 2
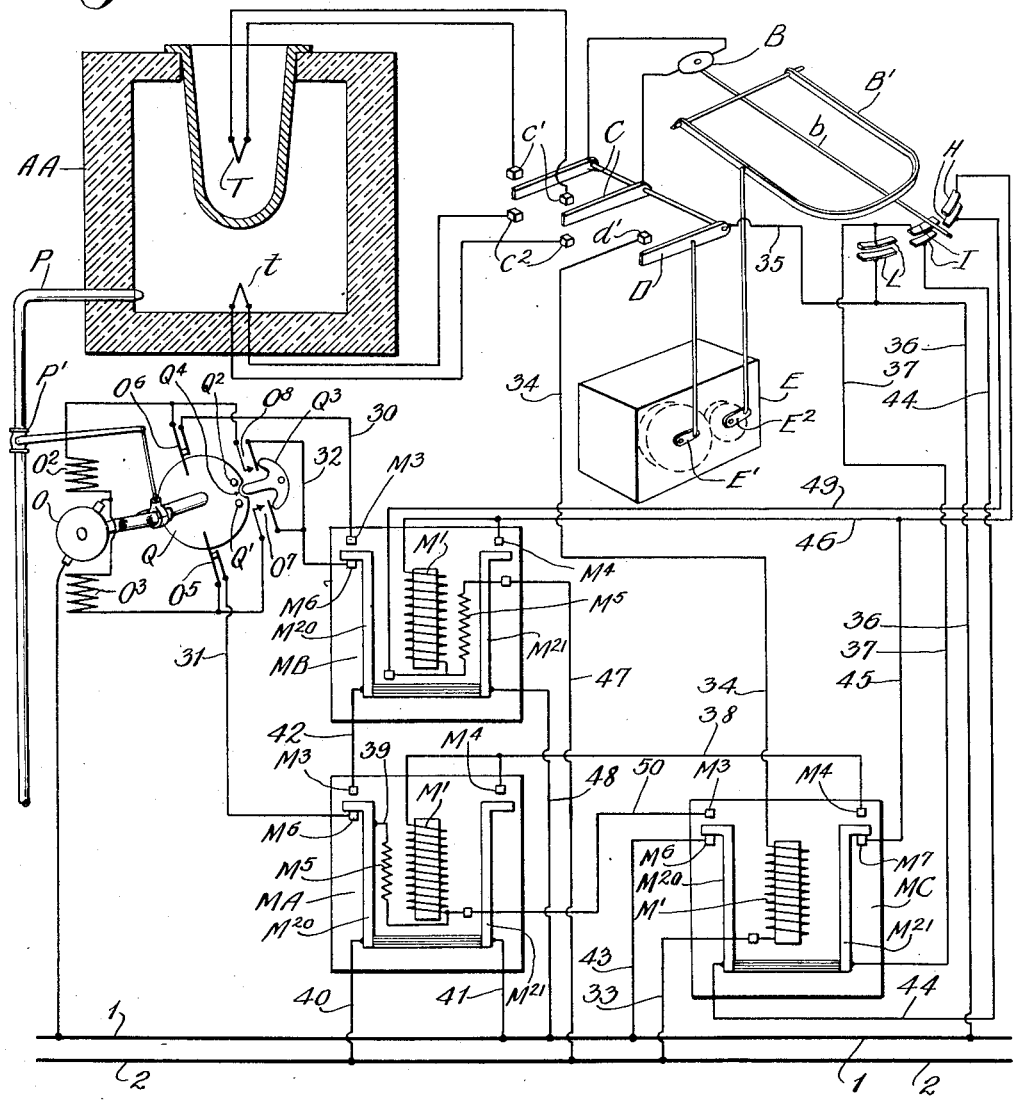
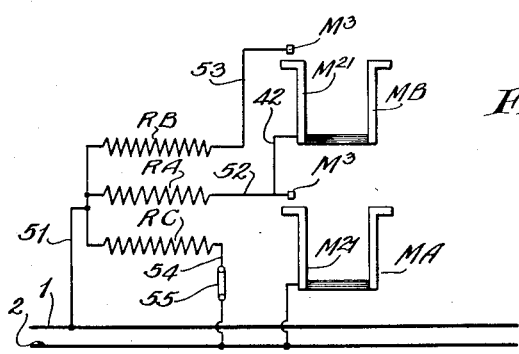
INVENTOR.
A. E. KROGH
BY John E. Hubbell
ATTORNEY Patented Oct. 13, 1931

1,827,528

UNITED STATES PATENT OFFICE

ANKER E. KROGH, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

CONTROL APPARATUS

Application filed March 28, 1929. Serial No. 350,782.

The general object of my present invention is to provide improvements in control apparatus, and particularly in control apparatus in which regulating effects are made automatically dependent on variations in two variables, to the end of minimizing the departure of one or both variables from predetermined values, unless and except as such departure of one variable may be necessary to prevent the other variable from attaining an objectionable value.

The present invention was primarily devised and is especially adapted for use in connection with a muffle furnace or heat treating furnace of the kind where given material is desirably maintained at a predetermined temperature by indirect heating.

In connection with such a furnace it has heretofore been common to employ a temperature responsive device, which commonly is a thermo-couple designated as a work thermo-couple, to measure the work temperature, and to employ a second temperature responsive device which commonly is a thermo-couple also, and is conveniently designated as a furnace thermo-couple, to measure the temperature in the furnace at a point at which the temperature is normally higher than the work temperature. These two thermo-couples have heretofore been used in connection with a control instrument comprising a galvanometer and means for connecting the galvanometer to the two thermo-couples at alternate intervals, and also comprising contact devices selectively actuated according to the extent of galvanometer deflection. Such an instrument as heretofore constructed and operated, has served to actuate one contact device to thereby increase the rate of heat supply whenever the temperature of the work thermo-couple is below a predetermined value, and to actuate a second contact device to thereby diminish the rate of heat supply when the work thermo-couple reaches said predetermined value, and to actuate a third contact device to thereby diminish the heat supply whenever the furnace thermo-couple reaches a predetermined maximum safe value which is somewhat higher than the desired work temperature.

The present invention eliminates disadvantages and overcomes difficulties which have been experienced in the use of the above described type of control instrument as heretofore constructed and operated. In particular, the invention permits the furnace to be controlled selectively by one thermo-couple or the other, depending upon which thermocouple will give the closest control of the work temperature which in turn is dependent upon the adjustments of the contact positions between the high and the intermediate contacts. This difference may be made quite small in the present instrument because while both thermo-couples exercise control, the control effect of each is affected by the temperature of the other. The smallness of the intermediate range allowable in the present instrument is due to the fact that in this instrument both thermo-couples have a controlling influence whereas in former instruments of this type the high contact, actuated by the furnace thermo-couple has been merely and purely a safety contact. Such purely safety action is completely avoided in the present instrument. The tendency to hunting experienced in practically all furnace control systems is especially noticeable in control systems for muffle furnaces because of the very considerable time lag between a change in the controlled temperature requiring a change in the rate of heat supply, and the effect on the controlled temperature of a corrective change in the rate of heat supply which results from the relatively large heat storage capacity of the furnace.

In a furnace of the kind described, conditions sometimes develop in which the furnace may become seriously overheated without raising the work temperature to its desired value. Under such conditions a control instrument of the kind heretofore used tends to increase the rate of heat supply whenever the work thermo-couple is connected to the galvanometer, and to diminish the heat supply when the furnace thermocouple is connected to the galvanometer, with the result that the furnace temperature rises more or less gradually beyond the maximum safe value. When control is had by a com bination of the two couples the furnace may become excessively hot while the work temperature is low.

The above mentioned difficulties are avoided with the present invention in consequence of provision made for insuring a tendency to reduce the rate of heat supply whenever the work thermo-couple reaches the desired maximum temperature, and in consequence of provisions made for causing the heat supply to be diminished whenever the furnace temperature reaches the allowable value, and for preventing any subsequent increase in the rate of heat supply until the furnace temperature is diminished below said allowable value.

In a desirable practical embodiment of my invention illustrated herein, I employ one relay to directly control the rate of heat supply to the furnace, and directly control that relay by the work thermo-couple, and indirectly control that relay through a second relay which is normally controlled by the furnace thermo-couple, but is also subjected to a control action by the work thermo-couple when the latter subjects the meter to a deflection over-shooting the intermediate contact so that the high contact is selected. In the construction referred to, the first relay increases the rate of heat supply when energized, and diminishes it when de-energized; and the second relay, when energized, de-energizes the first relay unless the latter be already de-energized, and prevents the latter from being re-energized until the second relay is de-energized. The energization and de-energization of each relay is controlled by meter actuated contacts and circuit connections between the relays and the controlling contacts, in timed relation with the change in the connections between the meter and the thermo-couples, so that the second relay remains energized throughout any period in which the furnace thermo-couple temperature is not below the allowable temperature, and so that the actuation of the intermediate contact is prevented from diminishing the rate of heat supply when such actuation occurs during a period in which the furnace thermo-couple is connected to the galvanometer.

It will be understood, of course, that the invention is adapted for use in furnaces of varying sorts. For example, if the furnace is an electric furnace, control may be effected by simply connecting the total heating resistance of the furnace to, and disconnecting it from a source of current, or by so connecting and disconnecting a portion of the heating resistance in case the furnace is of a type in which some of the heat is supplied by current flow through a resistor constantly in circuit. In the case of a furnace heated by the combustion of fluid fuel the control mechanism may operate on a valve or other means regulating the rate at which all or a portion of the fuel required is supplied.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

Of the drawings:—

Fig. 3 is a diagrammatic representation of another desirable embodiment of the present invention; and Fig. 4 is a diagrammatic representation of a modification of a portion of the apparatus shown in Fig. 3.

Figure 1:
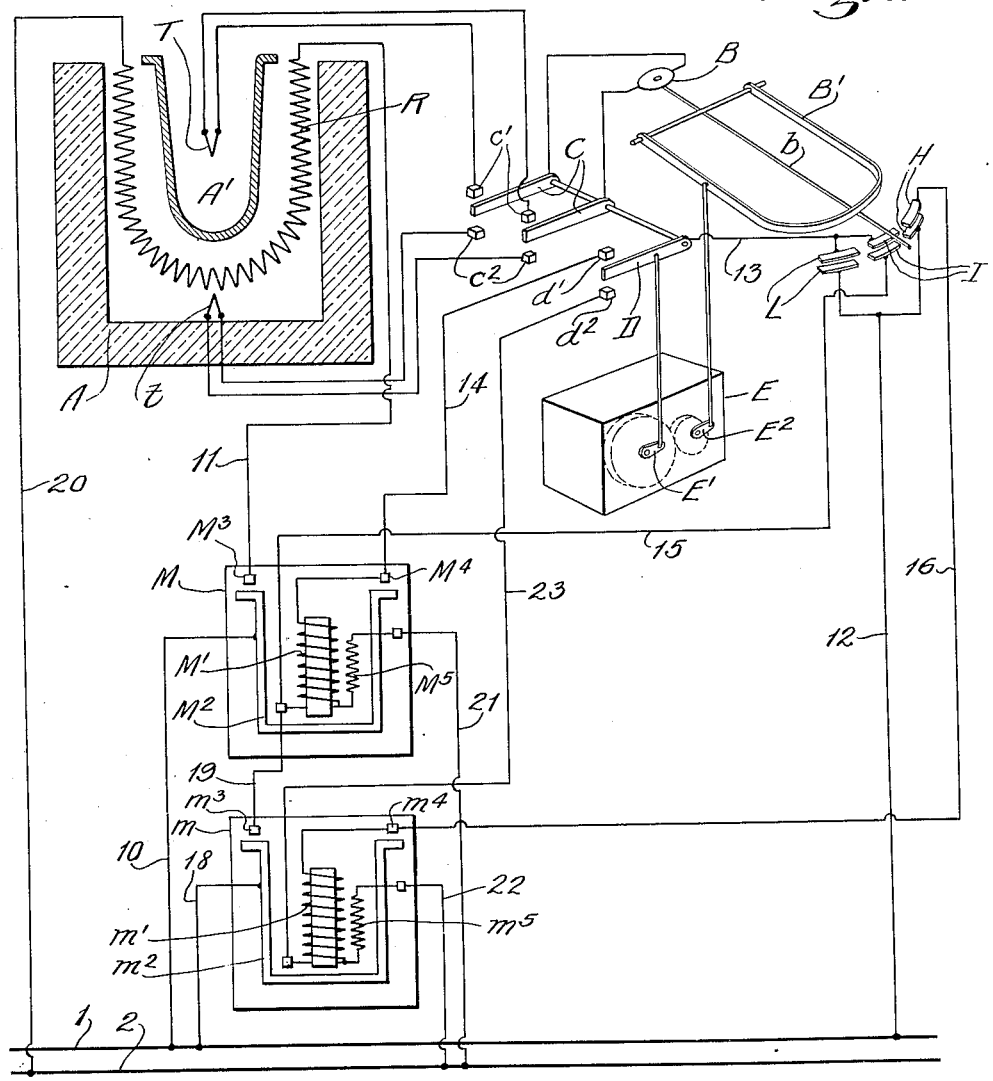
Fig. 1 is a diagrammatic representation of a desirable embodiment of the present invention.

The arrangement shown in Fig. 1 of the drawings comprises a conventionally illustrated electric furnace A of the type in which a bath of molten lead or other material is normally maintained in molten condition in the working chamber A' of the furnace. The furnace is heated by current flow through the resistor heater element R. The energizing current for the resistor element R is furnished by supply conductors 1 and 2 through branch conductors 10, 11 and 20, and the current flow is directly controlled by a relay M. The latter, as shown, is of well known type comprising a coil M' which, when energized, attracts an armature $M^2$ and moves the latter into engagement with a switch contact $M^3$. The branch conductor 10 is connected to the armature $M^2$ and the conductor 11 leads from one terminal of the resistor R to the switch contact $M^3$. The armature $M^2$ when energized engages a contact $M^4$, and thereby closes a holding-in circuit including a resistance $M^5$, as hereinafter described. The energization of the coil M' of the relay M is controlled by a control instrument, directly under certain conditions, and under other conditions indirectly through a second relay m. The latter may be, and as shown is, a counter-part of the relay M comprising parts $m'$, $m^2$, $m^3$, $m^4$ and $m^5$, corresponding, respectively, to the parts M', $M^2$, $M^3$, $M^4$ and $M^5$ of the relay M.

The control instrument in the form diagrammatically illustrated in the drawings, comprises a galvanometer B having a deflecting pointer b, a switch mechanism comprising blades C to which the terminals of the meter B are connected and which are movable between one position in which they engage contacts C' connected to the terminals of a temperature responsive device T, and a second position in which they engage contacts C² connected to the terminals of a second temperature responsive device *t*, normally open contacts L, I and H, closed at intervals, as hereinafter described, by means selectively dependent on the position of the galvanometer pointer *b*, and a switch mechanism comprising a switch blade D adjusted in timed relation with the switch blades C, and effecting certain adjustments in the control circuits including the windings M' and *m*' of the relays M and *m* and the contacts L, I and H.

The temperature responsive device T is shown as a so-called work thermo-couple, responsive to the temperature of the bath in the furnace chamber A', and the temperature responsive device *t* is a so-called furnace thermo-couple, responsive to a furnace temperature normally higher than the bath temperature, and which advantageously is the temperature of the furnace resistor R, or is a furnace temperature which varies with, and is a measure of, the resistor temperature.

The control instrument comprises a clock meter or timing mechanism E, conventionally illustrated as comprising a rotating crank E' giving simultaneous movements to the switch blades C and D, and also serving through a crank E², rotating at twice the velocity of the crank E' to periodically raise and lower the depressor yoke B' of the control instrument and thereby periodically depress the galvanometer pointer *b* and cause the latter to close whichever one of the normally open contacts L, I and H may then be beneath it. As previously stated, the drawing is diagrammatic and conventional, and in practice the contacts L, I and H, the switches C and D, and the timing mechanism E employed, may each be identical with, or generally similar to, control contacts, switches and timing devices heretofore developed for use in control meters, and may comprise the usual provisions, employed in such devices, to minimize sparking troubles, to minimize the stress put on the meter pointer (*b*), and to minimize the duration of the intervals in which the pointer *b* is not free to deflect.

When the movable element of the switch blades C are in position to connect the terminals C' of the work thermo-couple T to the terminals of the galvanometer B, the switch blade D engages the stationary switch contact *d*'. When the switch blades C connect the galvanometer terminals to the terminals C² of the furnace thermo-couple *t*, the switch blade D engages the stationary contact *d*². The pointer *b* is depressed once for each connection of the work thermo-couple T to the galvanometer, and once for each depression of the furnace thermo-couple *t* to the galvanometer.

If, when the galvanometer pointer *b* is depressed, the galvanometer is connected to the work thermo-couple T, and the temperature to which that thermo-couple responds, is lower than is desirable, the depression of the galvanometer pointer *b* will close the contact L. This will close an energizing circuit for the coil M' of the relay M, comprising supply conductor 1, branch conductor 12, contacts L, conductor 13, switch parts D and *d*', conductor 14, coil M', resistance M⁵, branch conductor 21, and main conductor 2. The current flow then produced will energize the coil M' if the latter is not already energized and thereby attract and elevate the armature M² which then connects conductors 10 and 11, and thereby causes current to flow through the resistor R.

The armature *m*² when attracted also engages the contact M⁴, and thereby completes a holding-in circuit for the relay comprising conductor 1, conductor 10, armature M², contact M⁴, winding M', resistance M⁵, and conductor 21, extending from the resistance M⁵ to the supply conductor 2. The closure of this holding circuit prevents the coil M', when energized as previously described, from becoming de-energized as soon as the elevation of the depressor B' permits the galvanometer pointer *b* to rise and thereby open the contacts L, or when the separation of the switch blade D from the contact *d*' occurs. With the holding-in circuit for the relay M energized as described, a subsequent closure of the contacts L will not disturb the condition of the relay M.

If, when the work thermo-couple T is connected to the galvanometer and the contact *d*' is engaged by the switch blade D, the work temperature exceeds the desired value and the galvanometer pointer *b*, when depressed, closes the contacts I, the winding M' of the relay M is de-energized, and the current flow through the resistor R is interrupted. Under the conditions described, a low resistance shunt comprising the conductor 15, contacts I, conductor 13, switch D, contact *d*', and conductor 14, is closed about the relay winding M', thereby de-energizing the latter. It will be observed that current flow between the conductors 1 and 2 through this low resistance shunt is kept down to a suitably safe value by the resistance M⁵ which is in the circuit between the conductors 1 and 2 then established, and comprising conductor 21, resistance M⁵, conductor 15, conductor 13, switch D, contact *d*', conductor 14, armature M², and conductor 10.

Whenever the high contacts H are closed the relay *m* is energized and by its energization de-energizes the relay M, if the latter be previously energized. The closure of the contacts H energizes the relay *m* by completing the circuit between the supply conductors 1 and 2, formed by the conductor 12, conductor 16, coil *m*' and resistance *m*⁵ of the relay *m*, and conductor 22. The energization of the relay coil $m'$ raises the armature $m^2$ of the relay and establishes a current flow between the conductors 1 and 2 through the holding-in circuit formed by the conductor 18, armature $m^2$, contact $m^4$, winding $m'$, resistance $m^5$, and conductor 22, which maintains the energization of the coil $m'$ when the contacts H subsequently open.

If the meter deflection is such as to effect a closure of the intermediate contacts I at a time when the furnace thermo-couple $t$ is connected to the galvanometer B, no effect is produced except the de-energization of the relay $m$, if the latter be previously energized. Such de-energization is then effected by the establishment of the low resistance shunt about the coil $m'$ and contact $m^4$ formed by conductor armature $m^2$, contact $m^3$, conductor 19, conductor 15, contacts I, conductor 13, switch blade D and contact $d^2$, and conductor 23.

If the contacts L are closed while the galvanometer is connected to the furnace thermo-couple, the relay $m$ if then energized, will be de-energized by virtue of the fact that the conductor 12, switch blade D and contact $d^2$, and conductor 23, then forms a low resistance shunt about a portion of the holding in circuit of the relay $m$, said portion comprising conductor 18, armature $m^2$, contact $m^4$ and winding $m'$.

The previously described operation may be summarized as follows: During any period in which the work thermo-couple T is connected to the galvanometer B, a closure of the contacts L will energize the relay M, while a closure of the contacts I will de-energize the relay M, unless the relay M be already energized when the contacts L are closed, or be already de-energized when the contacts I are closed, in which case the closure of the contacts will not change the condition of the relay M. Whenever the contacts H are closed the relay $m$ becomes or remains energized and thereby de-energizes the relay M unless the latter be already de-energized, in which case the energization of the relay $m$ does not change the condition of the relay M. When the relay $m$ is once energized it remains energized until a closure of the contacts I or of the contacts L is effected during a period in which the furnace thermo-couple $t$ is connected to the galvanometer B. In other words, after any energization of the relay $m$ the rate of heat supply cannot be increased prior to a subsequent actuation of the control apparatus which can occur only when the furnace temperature is less than that required to deflect the meter into position to actuate the contacts H.

Figure 2:
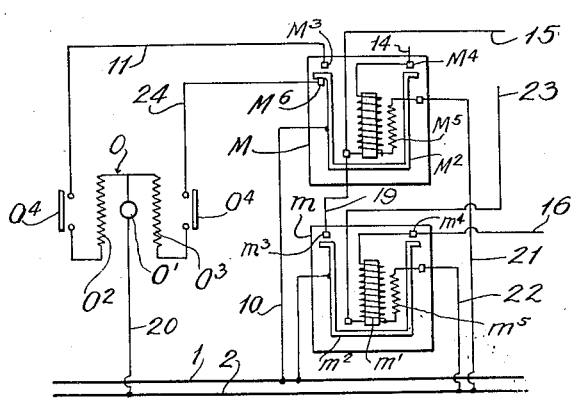
Fig. 2 is a diagrammatic representation of a modification of a portion of the apparatus shown in Fig. 1.

Fig. 2 of the drawings illustrates a modification of the apparatus shown in Fig. 1 in which the relay $m$ directly controls a relay motor O rotating in one direction to increase, and in the opposite direction to decrease a furnace heat supply or to perform other opposing regulating actions. In Fig. 2 the armature $O'$ and one field winding $O^2$ of the motor O are connected in series between the conductors 11 and 20, and the armature $O'$ and a second field winding $O^3$ are connected in series between the conductor 20 and a conductor 24 leading to a contact $M^6$ of the relay M. With the arrangement shown in Fig. 2, when the relay M is energized and its armature $M^2$ is raised to connect the conductor 11 to the conductor 10, the armature $O'$ rotates in the direction to increase the furnace rate of heat supply. When the relay M is de-energized, its armature $M^2$ engages the contact $M^6$ and thereby connects the conductor 24 through the conductor 10 to the supply conductor 1. This causes the armature $O'$ to rotate in the direction to diminish the rate of heat supply to the furnace. $O^4$ represents limit switches employed to fix the extent of rotation of the armature $O'$ occurring when the motor O is energized to run in the one direction or the other.

As already indicated, the general principles of the present invention may be utilized in control arrangements quite different in form from those already described, and in particular it may be utilized in arrangements in which the heat supply is varied in a plurality of steps. For example, with the arrangement shown in Fig. 3, provisions are made for supplying heat at a maximum rate when the work temperature is below its normal value and the furnace temperature is below its allowable value, and for supplying heat at a minimum rate when the work temperature equals or exceeds its normal value, and for supplying heat and an intermediate rate when the work temperature is below its normal value and the furnace temperature is not below its allowable value.

In Fig. 3, AA represents a pot furnace heated by the combustion of fuel supplied by a fuel supply pipe P at a rate depending on the adjustment of the fuel supply valve $P'$. The latter is adjustable into one or another of three operative positions in one of which fuel is supplied at a maximum rate, and in another of which it is supplied at a minimum rate, while in an intermediate position the valve $P'$ supplies fuel at an intermediate rate. As diagrammatically shown in Fig. 3, the valve $P'$ is adjusted by a reversible electric relay motor O such as the previously described motor O of Fig. 2. The motor O of Fig. 3 has associated with it a limit switch mechanism and energizing circuit connections including a conductor 30 which, when connected to the supply main 2, energizes the field winding $O^2$ of the motor and causes the latter to turn in the valve opening direction until it reaches the position giving the maximum opening of the fuel supply valve P'; a conductor 31 which, when connected to the supply main 2, energizes the field winding $O^3$ and causes the motor to turn in the valve closing direction until it reaches the position in which the valve P' supplies fuel at the minimum rate; and a conductor 32 which, when connected to the supply conductor 2, causes the motor O to turn in either direction required to reach the position in which the valve P' supplies fuel at a predetermined intermediate rate.

The limit switch mechanism associated with the motor O, as diagrammatically illustrated in Fig. 3, comprises a disc Q mounted on the motor shaft and carrying a pin Q' which opens the limit switch $O^5$ and thereby disconnects the conductor 31 from the winding $O^3$ of the motor O when the movement of the motor in the valve closing direction has adjusted the valve P' into the position in which it supplies fuel at the minimum rate. Similarly, another pin $Q^2$ carried by disc Q opens the limit switch $O^6$ and disconnects the conductor 30 from winding $O^2$ of the motor when the latter has moved in the opposite direction sufficiently to adjust the valve P' in the position in which it supplies fuel at the maximum rate. The disc Q also controls a switch actuator $Q^3$ adjusting switches $O^7$ and $O^8$ serving as required to connect the conductor 32 to one or the other of the windings $O^2$ or $O^3$ of the motor O, accordingly as the valve P' is in position to supply fuel at less or more than the intermediate rate. As diagrammatically shown, the switch actuator $Q^3$ is a pivoted member which when the disc Q permits, is moved by the resiliency of the switches $O^7$ and $O^8$ into the position in which both of said switches are open. The disc Q permits such movement only when the valve P' is in its intermediate position, at which time the resiliency of the switches $O^7$ and $O^8$ moves a portion of the part $Q^3$ into a peripheral notch $Q^4$ in the disc Q.

When the disc Q is moved from its intermediate position in the direction to give a closing adjustment of the valve P', the part $Q^3$ is cammed out of the notch $Q^4$ and into the position in which the switch $O^8$ is closed. When the disc Q is moved away from its intermediate position in the opposite direction, the switch $O^7$ is closed. Whenever the conductor 32 is energized, therefore, it energizes whichever of the motor windings $O^2$ or $O^3$ is effective to return the valve P' to its intermediate position, unless the valve P' is already in that position, in which case the energization of the conductor 32 is without effect on the motor O.

With the arrangement shown in Fig. 3, the conductors 30, 31 and 32 are energized by connecting them to the supply conductor 2, the opposite terminal of the motor O being permanently connected to the supply conductor 1. The means controlling the connection of the conductors 30, 31 and 32 to the supply conductor 2 comprises work and furnace thermo-couples T and $t$, and a control instrument B including switches C and D and a switch controller E exactly like the corresponding parts shown in Fig. 1, except that the apparatus shown in Fig. 3 does not include a contact $d^2$ engaged by the switch member D when the furnace thermo-couple is connected to the instrument B.

Associated with the parts of the apparatus of Fig. 3 already referred to, are three relays MA, MB and MC. The relays MA and MB are each identical in construction with the previously described relay except that the armature of each of the relays MA and MB is divided, comprising two conducting portions $M^{20}$ and $M^{21}$, which are insulated from one another. When either of the relays MA and MB is energized, its armature part $M^{20}$ and $M^{21}$ engage corresponding contacts $M^3$ and $M^4$, respectively, and when de-energized, the corresponding armature part $M^{20}$ engages the contact $M^6$ of the relay. The relay MC is shown as generally similar to the relays MA and MB, and when energized, its armature parts $M^{20}$ and $M^{21}$ engage corresponding contacts $M^3$ and $M^4$, and when deenergized, its armature part $M^{20}$ engages a relay contact $M^6$. In addition, the armature part $M^{21}$ of the relay MC, when the later is deenergized, engages a contact $M^7$. The winding arrangements for the relay MC may be, and are shown as simpler than those for the relays MA and MB, moreover, since the relay MC is energized whenever the switch member D engages the contact $d'$, and is de-energized at all other times. The energizing circuit for the relay MC includes a conductor 33 connecting one terminal of the energizing coil M' of the relay to the supply conductor 2, a conductor 34 connecting the other terminal of said coil to the contact $d'$, and conductors 35 and 36 connecting the switch arm D to the supply conductor 1.

In operation, and assuming an initial condition in which the work and furnace temperature are low, and in which neither of the relays MA and MB is energized, and in which the work thermo-couple T is connected to the galvanometer B and the relay MC is energized, then the depression of the galvanometer pointer $b$ by closing the contacts L effects the energization of the relay MA. The closure of the contacts L thus energizes the relay MA by completing the following energizing circuit: supply conductor 1, conductor 36, contacts L, conductor 37, armature part $M^{21}$ and contact $M^4$ of relay MC, conductor 38, windings M' and $M^5$ of relay MA, conductor 39, armature part $M^{20}$ of relay MA, conductor 40 and supply conductor 2. The energization of the relay MA completes a holding-in circuit for the relay which includes the contact $M^4$ and armature part $M^{21}$ of the relay, and the conductor 41 running to the supply conductor 1. The holding-in circuit thus established prevents the de-energization of the relay MB when the contacts L separate on the subsequent upward movement of the instrument depressor B'.

The energization of the relay MA at a time when the relay MB is de-energized, connects the conductor 32 to the supply conductor 2, through the contact $M^6$ and armature part $M^{20}$ of the relay MB, the conductor 42, the contact $M^3$ and armature part $M^{20}$ of the relay MA, and the conductor 40. The connection of the conductor 32 to the supply conductor 2 serves, unless the valve P' already occupies such intermediate position, to operate the motor O as required to adjust the fuel supply valve P' into its intermediate position in which fuel is supplied at an intermediate rate.

If, following the energization of the relay MA in the manner just described and the subsequent connection of the furnace thermocouple $t$ to the galvanometer B by the action of the switch actuator E, either the contacts L or the contacts I are closed, the relay MB will be energized. Such closure of the contacts I will energize the relay MB by closing the following circuit: supply conductor 1, conductor 43, contact $M^6$ and armature part $M^{20}$ of the then de-energized relay MC, conductor 44, contacts I, conductor 37, armature part $M^{21}$ and contact $M^7$ of relay MC, conductor 45, conductor 46, windings M' and $M^5$ of relay MB, conductor 47, and supply conductor 2. If at the period of operation last referred to, the contacts L and not the contacts I are closed, the relay MB is energized by the closure of the following circuit: conductor 1, conductor 36, contacts L, conductor 37, armature part $M^{21}$ and contact $M^7$ of the relay MC, conductor 45, conductor 46, windings M' and $M^5$ of the relay MB, conductor 47, and supply conductor 2. The energization of the relay MB establishes a holding-in circuit for the relay preventing it from being de-energized by the subsequent opening of the contact L or I which produced its energization. This holding-in circuit comprises supply conductor 1, conductor 48, armature part $M^{21}$, contact $M^4$ and windings M' and $M^5$ of the relay MB, conductor 47 and supply conductor 2.

With the relay MA already energized the effect of energizing the relay MB is to disconnect the conductor 32 from the supply conductor 2 and connect to the latter the conductor 30. The conductor 30 is thus connected to the supply conductor 2 through the armature part $M^{20}$ and contact $M^3$ of the relay MB, the conductor 42, the contact $M^3$ and armature part $M^{20}$ of the relay MA, and the conductor 40. The connection of the conductor 30 to the supply conductor 2 serves, as previously described, to operate the motor O as required to adjust the valve P' into the position in which fuel is supplied to the furnace AA at the maximum rate. After both relays MA and MB have been energized as described, their energization is maintained and the fuel supply to the furnace is continued at the maximum rate, until the furnace temperature reaches its allowable value, or until the work temperature reaches its predetermined or desired value. The attainment of the allowable furnace temperature results in the de-energization of the relay MB and a reduction in the rate of heat supply to the intermediate rate, while the attainment of the predetermined work temperature results in the de-energization of the relay MA and a reduction in the rate of heat supply to the minimum rate.

With both relays MA and MB energized, the attainment of the predetermined furnace temperature and the consequent closure of the contacts H de-energizes the relay MB by closing a low resistance shunt about the winding M' of the relay MB which comprises the conductors 46 and 49. It will be observed that the closure of the contacts H serves to de-energize the relay MB regardless of whether the furnace thermo-couple $t$, or the work thermo-couple T is connected to the galvanometer when the contacts H are closed. When the relay MB is de-energized with the relay MA still energized, the conductor 32 is connected to the supply conductor 2 as previously described, and the valve P' is brought into the position in which fuel is supplied to the furnace AA at the intermediate rate. When thereafter the furnace temperature is reduced to the extent required to effect a closure of the contacts I or L when the furnace thermo-couple $t$ is connected to the galvanometer B, the relay MB will again be energized and the fuel supply again increased to its maximum value provided the work temperature has not attained its predetermined value in the meantime. The fuel supply to the furnace may thus continue to fluctuate between its intermediate and maximum rates, as the furnace temperature rises to, and falls below, its allowable value, indefinitely, unless and until the work temperature attains its predetermined value.

Whenever the work temperature attains its predetermined value, the relay MA is de-energized regardless of whether the relay MB is then energized or de-energized. Such de-energization of the relay MA is produced on the closure of the intermediate contacts I at a time when the work thermo-couple T is connected to the galvanometer, in consequence of the closure of a low resistance shunt about the winding M' of relay MA. Said shunt comprises a conductor 50, contact $M^3$ and armature part $M^{20}$ of the relay MC (energized whenever work thermo-couple T is connected to the galvanometer B), conductor 44, contacts I, conductor 37, armature part $M^{21}$ and contact $M^4$ of relay MC, and conductor 38. When the relay MA is thus de-energized, the conductor 31 is connected to the supply conductor 2 through the contact $M^6$ and armature part $M^{20}$ of the relay MA, and the conductor 40. The connection of the conductor 31 to the supply conductor 2 serves, as previously described, to so operate the motor O that the valve P' is adjusted into the position in which fuel is supplied to the furnace AA at the minimum rate. With the relay MA de-energized, the energization or de-energization of the relay MB does not effect the operation of the motor O, because the conductor 42 through which the relay MB exerts its controlling effect upon the motor O, is then a dead end in consequence of the disengagement of the contact $M^3$ and armature part $M^{20}$ of the relay MA.

In summary and restatement of part of what has been said about the operation of the apparatus shown in Fig. 3, it is noted that the relay MA is controlled by the temperature of the work thermo-couple T, and that the latter constitutes a master controller in the sense that it reduces the fuel supply to the minimum rate whenever the work temperature attains its predetermined value regardless of what the furnace temperature may then be. The energization of the relay MB depends upon the temperature of the furnace thermo-couple $t$, and during periods in which the master work thermo-couple does not restrict the fuel supply to its minimum rate, the furnace thermo-couple $t$ exerts a subsidiary controlling effect, which consists in varying the fuel supply rate between its intermediate and maximum values, accordingly as the furnace temperature rises to, and falls below, its predetermined value.

The control system shown in Fig. 3 is applicable, of course, to an electrically heated furnace as well as to one heated by the combustion of fuel, and in Fig. 4 I have illustrated so much of an electrically heated furnace provided with the control provisions of Fig. 3 as is necessary for an understanding of this application of the control system of Fig. 3. In Fig. 4, RA, RB, and RC represent three furnace heating resistance elements each having one terminal connected to the supply conductor 1 through a common branch conductor 51. The second terminal of the element RA is connected by a conductor 52 to the previously described conductor 42, and the second terminal of the element RB is connected by a conductor 53 to the contact $M^3$ of the relay MB. The second terminal of the resistance element RC is connected by a conductor 54 to the supply conductor 2. With the arrangement shown in Fig. 4 all three resistance elements RA, RB and RC will be connected in circuit, and the furnace will be heated at the maximum rate when the relays MA and MB are both energized. With the relay MA energized and the relay MB de-energized, the elements RA and RC are in circuit, and the element RB is out of circuit so that heat is then supplied at the intermediate rate. With the relays MA and MB both de-energized only the element RC is in circuit and heat is supplied to the furnace at the minimum rate. With the relay MA de-energized heat is supplied at the minimum rate regardless of condition of relay MB.

With the arrangement shown in Fig. 4, if the resistance element RC be dispensed with, or if the switch 55 in its energizing circuit be opened, the operation of the apparatus shown will not be changed, except that with both relays MA and MB de-energized. the minimum rate of heat supply will then be a zero rate of supply, and the furnace will cool more rapidly than it would if the resistance element RC were in use. The effect of opening the switch and thus dispensing with the resistance element RC of Fig. 4 is exactly analogous to the effect which would be obtained by so adjusting the operating connections for the valve P' of Fig. 3, that the minimum heat supply position of the valve P' is a position in which the supply of fuel through the pipe P is totally interrupted. Such a change has no direct effect upon the operation of the control system and only effects the latter indirectly insofar as it tends to a more rapid cooling off of the furnace when both relays MA and MB are de-energized.

Aside from the effective protection against furnace overheating and the certainty of a reduction in the heat supply when the work thermo-couple attains the maximum desired temperature, the invention possesses the further advantage in that the apparatus required is relatively simple and effective and that unnecessary movements of important parts of the control mechanism are minimized, and wear of the parts and particularly of the contacts is diminished.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:—

1. Control apparatus comprising in combination a deflecting meter, devices selectively actuated by said meter accordingly as the meter deflection is at a low, high, or intermediate value, a work thermo-couple, a heater thermo-couple, means for connecting said meter to said thermo-couples alternately, furnace control mechanism and connections through which said devices actuate said mechanism to normally increase and decrease the furnace heat supply accordingly as the temperature of one of said thermo-couples is less than or as great as a predetermined temperature for said one thermo-couple and for maintaining the heat supply at less than its maximum value throughout any period in which the temperature of the other thermo-couple is not less than a predetermined value for the last mentioned thermo-couple.

2. Control apparatus comprising in combination a deflecting meter, relays selectively actuated by said meter accordingly as the meter deflection is at a low, high or intermediate value, a work thermo-couple, a heater thermo-couple, means for connecting said meter to said thermo-couples alternately, furnace control mechanism and connections through which said relays actuate said mechanism to normally increase and decrease the furnace heat supply accordingly as the furnace temperature is less than, or as great as a predetermined furnace temperature and for maintaining the heat supply at less than its maximum value throughout any period in which the work temperature is not less than a predetermined value.

3. Control apparatus comprising in combination a deflecting meter, devices selectively actuated by said meter accordingly as the meter deflection is at a low, high, or intermediate value, a work thermo-couple, a furnace thermo-couple, means for connecting said meter to said thermo-couples alternately, furnace control mechanism, connections through which said devices actuate said mechanism and means for adjusting certain of said connections operating in timed relation with the first mentioned means so that the actuation of one of said devices tends to produce different results accordingly as the meter is connected to one or the other of the two thermo-couples.

4. Control apparatus comprising in combination a deflecting meter, devices selectively actuated by said meter, one of said devices being actuated when the meter deflection is relatively low, a second device being actuated when the meter deflection is relatively high, and a third device being actuated when the meter deflection is intermediate said low and high deflections, means for connecting said meter at recurring intervals to a source of meter deflection and at intervals alternating with the first mentioned intervals to a second source normally producing greater meter deflections than are produced by the first mentioned source, mechanism tending to produce a controlling effect in one direction whenever said one device is actuated and tending to produce a controlling effect in the opposite direction whenever said second device is actuated, and means operating in timed relation with the first mentioned means for rendering said third device effective to produce a control effect in said opposite direction when said meter is connected to the first mentioned source of meter deflection and effective to produce a control effect in said one direction when the meter is connected to said second source.

5. Furnace control apparatus comprising in combination a relay, means responsive to a work temperature normally operative to actuate said relay to increase or decrease the furnace heat supply accordingly as the work temperature falls below or increases to a predetermined temperature, a second relay which in one condition permits, and in another condition prevents, action of the first mentioned relay to increase the heat supply, means responsive to a furnace temperature for putting said second relay into said one condition or the other accordingly as the furnace temperature is less or not less than a predetermined temperature, a single control instrument actuated by said work temperature responsive means and furnace temperature responsive means to actuate said relays.

6. Furnace control apparatus comprising in combination a relay, means responsive to a work temperature normally operative to actuate said relay to increase or decrease the heat supply to the furnace accordingly as the work temperature falls below or increases to a predetermined temperature, a second relay which in one condition permits, and in another condition prevents, actuation of the first mentioned relay to increase the heat supply, means responsive to a furnace temperature for putting said second relay into said one condition or the other accordingly as the furnace temperature is less or not less than a predetermined temperature, and means actuated by the means responsive to work temperature for putting said second relay into said other condition.

7. Furnace control apparatus comprising in combination a relay, means responsive to a work temperature normally operative to actuate said relay to maintain the furnace heat supply at a predetermined rate or to diminish the furnace heat supply accordingly as the work temperature is less than or as great as a predetermined temperature, a second relay which in one condition permits, and in another condition prevents, the action of the first mentioned relay from maintaining the heat supply at said rate, means responsive to a furnace temperature for putting said second relay into said one condition or the other accordingly as the furnace temperature is less than a predetermined temperature, and means actuated by the means responsive to work temperature for putting said second relay into said second condition.

8. Control apparatus comprising in combination a deflecting meter, devices selectively actuated by said meter accordingly as the meter deflection is at a low, intermediate, or high value, means for connecting said meter at recurring intervals to a source of meter deflection and for connecting said meter at intervals alternating with the first mentioned intervals to a second source of meter deflection tending to produce greater deflections than are produced by the first mentioned source, a control relay, a second relay, and connections between said relays and devices, including means operating in timed relation with the first mentioned means, tending to actuate the first mentioned relay in one direction when the low device is actuated, and in the opposite direction when said second device is actuated during an interval in which said meter is connected to the first mentioned source, said connections including means through which said second relay is actuated to actuate the first mentioned relay in the opposite direction whenever said intermediate or high device is actuated and for maintaining said second relay in condition to prevent actuation of the first mentioned relay in said one direction until the meter deflection, when connected to said second source is less than said high value.

9. In a system involving a controllable condition such as a heat supply and at least two variable conditions such as work and furnace temperatures which vary in accordance with changes of the controllable condition, in combination a first means responsive to one of said variable conditions, a second means responsive to the other variable condition, control means for adjusting said controllable condition, and means interconnecting the first means and the second means and the control means so as to adjust the control means to any of three degrees of control corresponding to combinations of degrees of variation in said variable conditions.

10. In a system involving at least one controllable condition such as a heat supply and at least two variable conditions such as work and furnace temperatures which vary in accordance with changes of the controllable condition, in combination a first means operable to on and off adjustments in response to one of said variable conditions, a second means operable to on and off adjustments by the other variable condition, control means for adjusting said controllable condition operated to any of three degrees of control by combinations of on and off adjustments of the first means and the second means.

11. In a system involving at least one controllable condition such as a heat supply and at least two variable conditions such as work and furnace temperatures which vary in accordance with changes of the controllable condition, in combination a first means operable to on and off adjustments in response to one of said variable conditions, a second means operable to on and off adjustments by the other variable condition, control means operated by the first means and the second means for adjusting said controllable condition to a first degree of control when the first means and the second means each is in off adjustment, to a second degree of control when the first means is in off adjustment, to a third degree of control when the first means and the second means is in on adjustment.

12. An automatic temperature control system for furnaces having a three-position regulating device for supplying heat slowly, moderately, or rapidly, work temperature measuring means, furnace temperature measuring means, a single control instrument alternately actuated by said two means and having low, normal, and high control positions, control means associated with said instrument for operating the regulating device to supply heat slowly when the work temperature is at or above normal, to supply heat moderately when the work temperature is low and the furnace temperature is normal or high, to supply heat rapidly when the work and furnace temperatures are low.

Signed at Philadelphia, in the county of Philadelphia and State of Pennsylvania, this 25th day of March A. D. 1929.

ANKER E. KROGH.